United States Patent
Moore et al.

(10) Patent No.: US 10,576,877 B2
(45) Date of Patent: Mar. 3, 2020

(54) ILLUMINATED GRILLE

(71) Applicant: Honda Patents & Technologies North America, LLC, Torrance, CA (US)

(72) Inventors: Daniel Ian Moore, Dublin, OH (US); Nicholas P Ziraldo, Powell, OH (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 35 days.

(21) Appl. No.: 15/469,022

(22) Filed: Mar. 24, 2017

(65) Prior Publication Data
US 2018/0272927 A1    Sep. 27, 2018

(51) Int. Cl.
*B60Q 1/26* (2006.01)
*B60R 19/52* (2006.01)
*F21V 8/00* (2006.01)

(52) U.S. Cl.
CPC ............ *B60Q 1/2661* (2013.01); *B60R 19/52* (2013.01); *B60R 2019/525* (2013.01); *G02B 6/001* (2013.01)

(58) Field of Classification Search
CPC .. G02B 6/0001; B60Q 1/2661; B60Q 1/2696; F21V 5/04; F21V 11/00
USPC .......................................................... 362/511
See application file for complete search history.

(56) References Cited

U.S. PATENT DOCUMENTS

| | | |
|---|---|---|
| 4,673,609 A | 6/1987 | Hill |
| 4,920,460 A | 4/1990 | Mori |
| 4,977,487 A | 12/1990 | Okano |
| 4,977,695 A | 12/1990 | Armbruster |
| 5,369,554 A | 11/1994 | Erion |
| 5,452,931 A | 9/1995 | Chase |
| 6,802,635 B2 | 10/2004 | Robertson et al. |
| 6,893,147 B2 | 5/2005 | Schottland et al. |
| 6,986,597 B2 | 1/2006 | Elwell |
| 7,036,873 B2 | 5/2006 | Pommeret et al. |
| 7,111,970 B2 | 9/2006 | Gasquet |
| 7,163,320 B2 | 1/2007 | Liu |
| 7,163,321 B2 | 1/2007 | Contarino |
| 7,182,398 B2 | 2/2007 | Lin |
| 7,204,626 B2 | 4/2007 | Elwell |

(Continued)

FOREIGN PATENT DOCUMENTS

| | | |
|---|---|---|
| EP | 0214827 A2 | 3/1987 |
| WO | WO2005018987 A1 | 3/2005 |

OTHER PUBLICATIONS

"Tundra Grille Insert with Backlit Lettering" DBCustomz, pp. 1-6, https://www.dbcustomz.com/product/2016-tundra-grille-insert-with-backlit-lettering/ (Accessed Dec. 19, 2016).

*Primary Examiner* — Bryon T Gyllstrom
(74) *Attorney, Agent, or Firm* — Honda Patents & Technologies North America, LLC; Mark E. Duell

(57) ABSTRACT

A grille for a motor vehicle includes a base extending around a perimeter of the grille, a light guide received in the base extending around the perimeter of the grille, a light source for illuminating the light guide when activated, and a lens covering the base and the light guide. A light blocker may mask an interior of the lens except at a portion where light from the light guide is to pass when the light guide is illuminated. A film covers an exterior of the lens and has a predetermined surface appearance when the light guide is not illuminated and allows light to pass through the film upon illumination of the light guide.

19 Claims, 5 Drawing Sheets

(56) References Cited

U.S. PATENT DOCUMENTS

| | | | |
|---|---|---|---|
| 7,226,187 B2 | 6/2007 | Yamazaki et al. | |
| 7,278,768 B2 | 10/2007 | Gasquet | |
| 7,712,933 B2 | 5/2010 | Fleischmann et al. | |
| 8,113,701 B2* | 2/2012 | Ishikawa | B60R 1/1207 362/487 |
| 8,177,401 B2* | 5/2012 | Hwang | B60R 1/1207 362/494 |
| 8,500,310 B2* | 8/2013 | Sakamoto | H05K 5/0017 362/330 |
| 8,752,989 B2* | 6/2014 | Roberts | G09F 13/06 362/496 |
| 8,823,552 B1 | 9/2014 | Raphael et al. | |
| 9,081,125 B2 | 7/2015 | Dau et al. | |
| 9,108,581 B2 | 8/2015 | Perez | |
| 9,162,616 B2 | 10/2015 | Wu | |
| 2007/0058382 A1* | 3/2007 | Lan | B60Q 1/2661 362/487 |
| 2008/0043484 A1 | 2/2008 | Lin | |
| 2009/0072556 A1* | 3/2009 | Kudelko | B60R 19/52 293/115 |
| 2010/0232174 A1* | 9/2010 | Arakawa | B60Q 1/2661 362/547 |
| 2013/0215631 A1 | 8/2013 | Micollier et al. | |
| 2014/0080400 A1 | 3/2014 | Parry-Williams | |
| 2014/0184068 A1* | 7/2014 | Kwon | B60Q 1/2603 315/80 |
| 2014/0204599 A1 | 7/2014 | Miura et al. | |
| 2015/0251589 A1 | 9/2015 | Dinant | |
| 2016/0062032 A1 | 3/2016 | Dau et al. | |
| 2016/0090027 A1 | 3/2016 | Tanaka et al. | |
| 2016/0109645 A1 | 4/2016 | Dau et al. | |
| 2016/0121799 A1 | 5/2016 | McClintock et al. | |
| 2016/0252228 A1 | 9/2016 | Martinez et al. | |
| 2016/0288700 A1* | 10/2016 | Chen | F21S 43/15 |

\* cited by examiner

ILLUMINATED GRILLE

TECHNICAL FIELD

The embodiments disclosed herein are related to the field of grilles of motor vehicles.

BACKGROUND

Many methods have been utilized to illuminate the grilles of motor vehicles for vehicle identification, personalization, and styling. One method has been to use light units that follow the profile of the grille but are directly below the chrome strip. Another method has been to light the grille using light-through chrome features produced using sputter-chromed acrylonitrile butadiene styrene.

The light-through chrome technology, however, is limited. To produce a lighted element in the front vehicle area, the options are restricted. Sputter-chroming is not ideal for lighting an entire grille because, when the light units are active, the part becomes semi-transparent, causing the light units and associated hardware to become visible. Therefore, there is a need for a grille lighting solution that maintains the grille as translucent when the light units are active, while maintaining a chrome finish when the light units are not active.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a grille for a motor vehicle includes a base extending around a perimeter of the grille, a light guide received in the base extending around the perimeter of the grille, a light source for illuminating the light guide when activated, a lens covering the base and the light guide, a light blocker masking an interior of the lens except at a portion where light from the light guide is to pass when the light guide is illuminated, and a film covering an exterior of the lens and having a predetermined surface appearance when the light guide is not illuminated and allows light to pass through the film upon illumination of the light guide.

According to another aspect, a grille for a motor vehicle includes a base extending around a perimeter of the grille, a light guide received in the base extending around the perimeter of the grille, a light source for illuminating the light guide when activated, and a lens component having a predetermined surface appearance when the light guide is not illuminated and allows light to pass through the film upon illumination of the light guide.

According to yet another aspect, a grille for a motor vehicle includes a base extending around a perimeter of the grille, a light guide received in the base extending around the perimeter of the grille, a light source for illuminating the light guide when activated, a lens formed of a transparent plastic material covering the base and the light guide, the lens being sealed to an outer edge of the base and an inner edge of the base, a light blocker made of an opaque plastic material masking an interior of the lens except at a portion where light from the light guide is to pass when the light guide is illuminated, and a film covering an exterior of the lens and having a predetermined surface appearance when the light guide is not illuminated and allows light to pass through the film upon illumination of the light guide.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
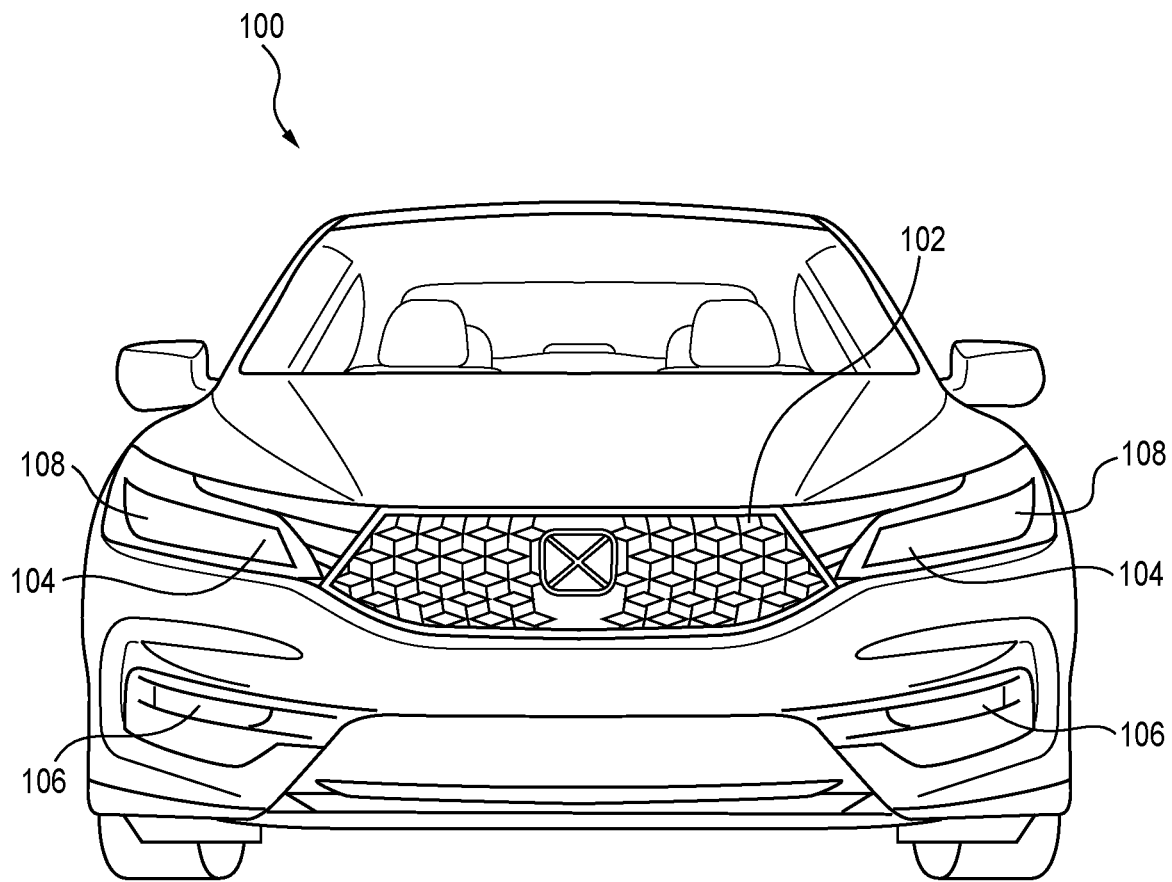
FIG. 1 is front view of a motor vehicle.

FIG. 1 illustrates the front of a motor vehicle 100 that includes a grille 102 that may be lit or illuminated. The grille 102 contains materials that allow for the illumination of the grille 102, and for the illumination to be controlled and consistent. The arrangement enables a styled area of illumination to be visible when vehicle lights, such as parking lights 104, fog lights 106, and/or headlights 108, are active and a standard chrome appearance when the lights are inactive.

Figure 2:
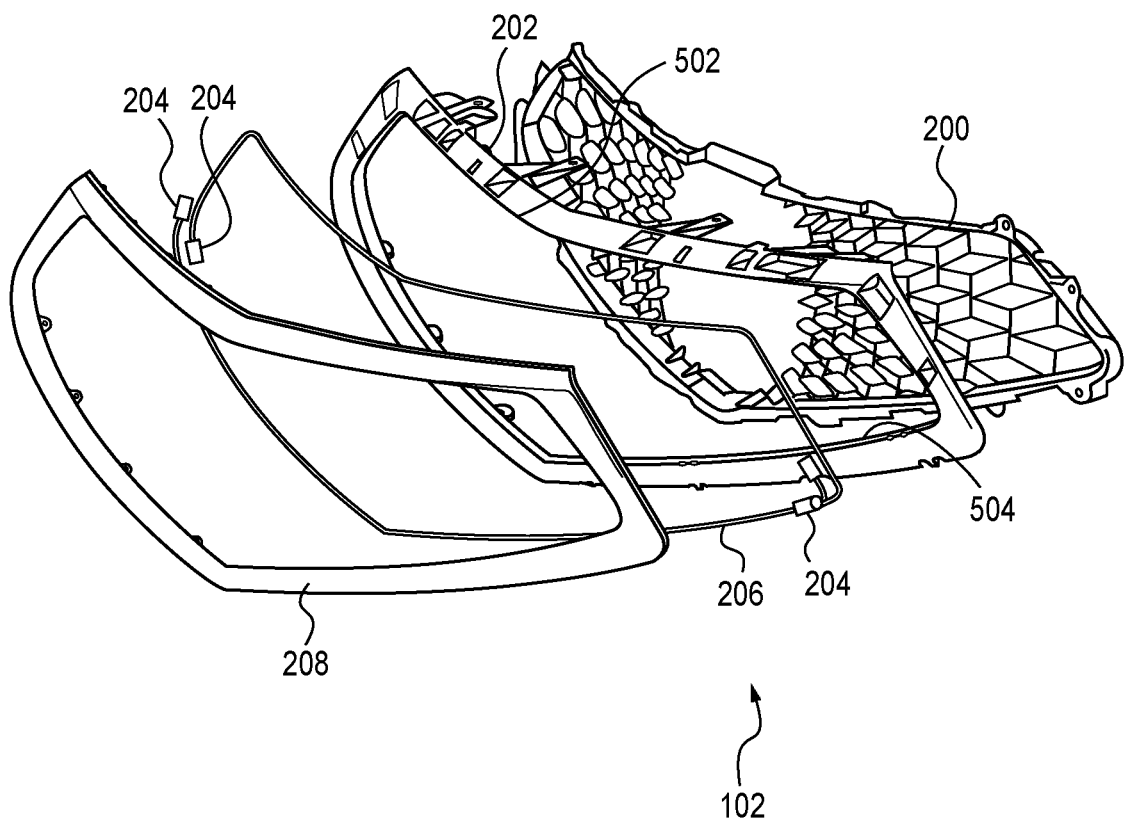
FIG. 2 is an exploded view of a grille for the motor vehicle.

Referring to FIG. 2, the grille 102 contains a mesh material layer 200, a base 202 that is a closed loop structural piece around the mesh material layer 200, a light source 204, such as a light emitting diode ("LED"), a light guide 206 for evenly distributing the light produced by the light source 204 and mounted to the base 202, and a lens component 208.

Figure 3:
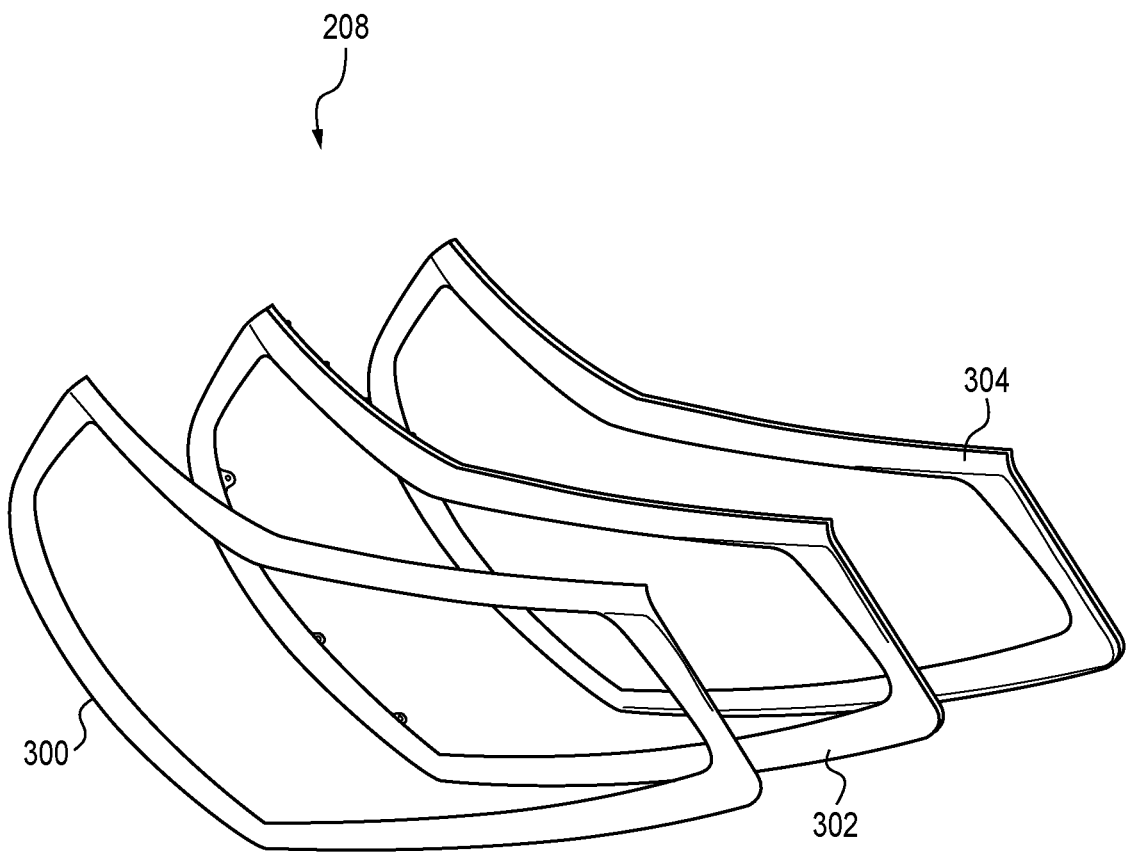
FIG. 3 is an exploded view of a lens component for the grille.

With reference to FIG. 3, the lens component 208 contains a film 300, such as a translucent chrome film that is back-injected with a lens 302. The lens component 208 may also contain a light blocker 304, which is a masking material applied to select areas of the lens 302 by, for example, an adhesive. The light guide 206, light blocker 304, and lens 302 allow for the light produced by the light source 204 attached to the base 202 to produce a desired illumination area or pattern when the light source 204 is active.

Figure 4:
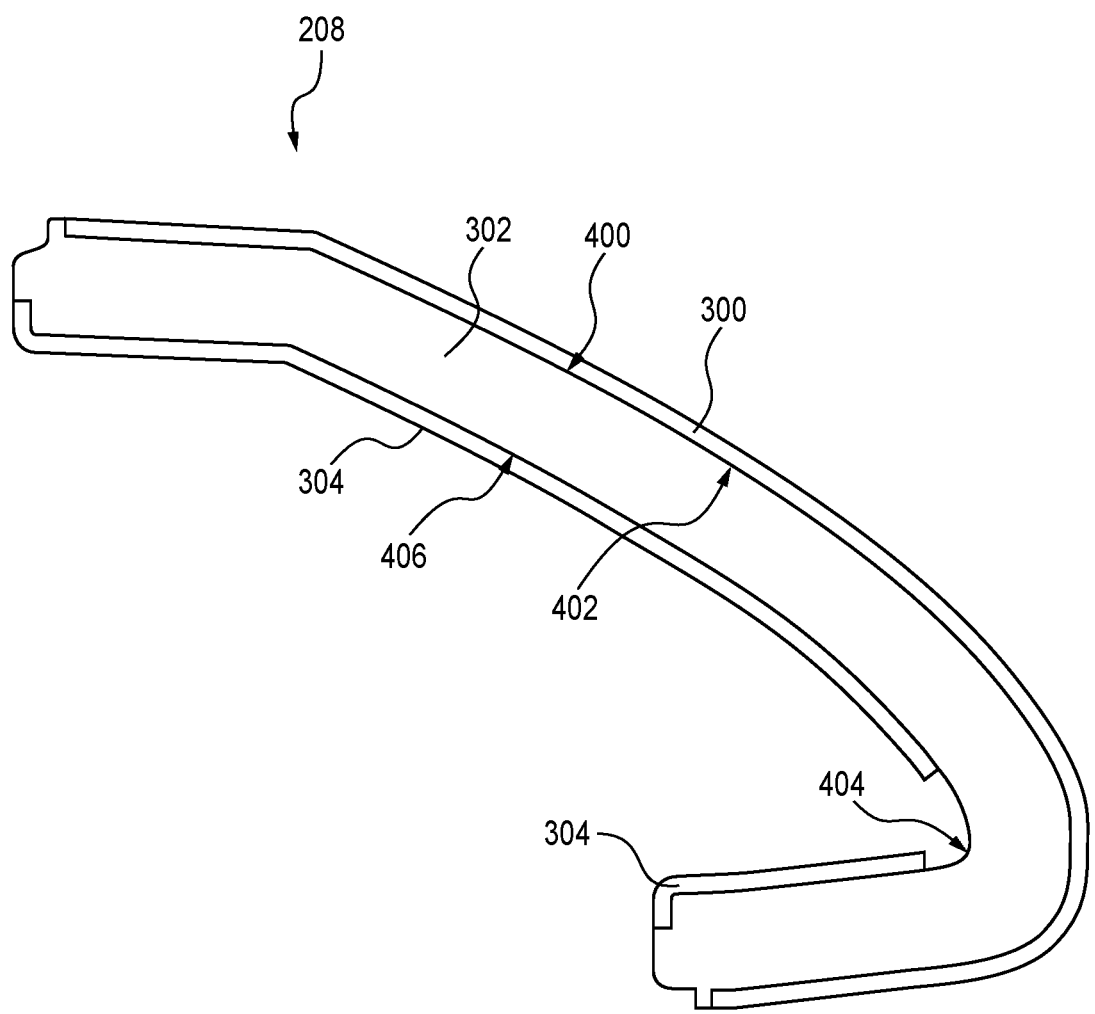
FIG. 4 is a cross-sectional view of the lens component.

Referring to FIG. 4, the lens component 208 is described in greater detail. The lens component 208 includes a film 300 that covers an exterior or front side 400 of the lens 302. The film 300 has a predetermined surface appearance, e.g., a bright film cover, and in the embodiments disclosed herein in, is a translucent chrome film with a printed design element or pattern on the back side 402 of the film 300. To create the lens component 208, the pre-formed film 300 is placed into a mold, and a transparent and clear plastic material of a predetermined thickness is injected into the mold to complete the lens 302. The film 300 may be translucent acrylonitrile butadiene styrene ("ABS"), translucent polycarbonate ("PC"), translucent poly(methyl methacrylate) ("PMMA"), nylon, lexan, Lucite, polyethylene, polypropylene, acrylic or copolymers thereof, and combinations thereof. The transparent plastic material that makes the lens 302 may be ABS, transparent PC, transparent PMMA, nylon, lexan, Lucite, polyethylene, polypropylene, acrylic or copolymers thereof, and combinations thereof.

To complete the lens component 208, a pre-formed light blocker 304, which includes a laser cut opening 404 through which light may pass, is attached to an interior or rear side 406 of the lens 302 by an adhesive. The light blocker 304 may be made from black and opaque ABS. In an alternative embodiment, two or more light blockers 304, such as one inner light blocker and one outer light blocker, may be provided if the laser cut opening 404 is continuous around the entirety of the perimeter of the lens component 208 or additional shapes are desired. In one embodiment, the cut opening 404 may be positioned at a corner or an area where portions of the lens 302 meet to further assist in focusing light on a specific part of the lens 302.

Figure 5:
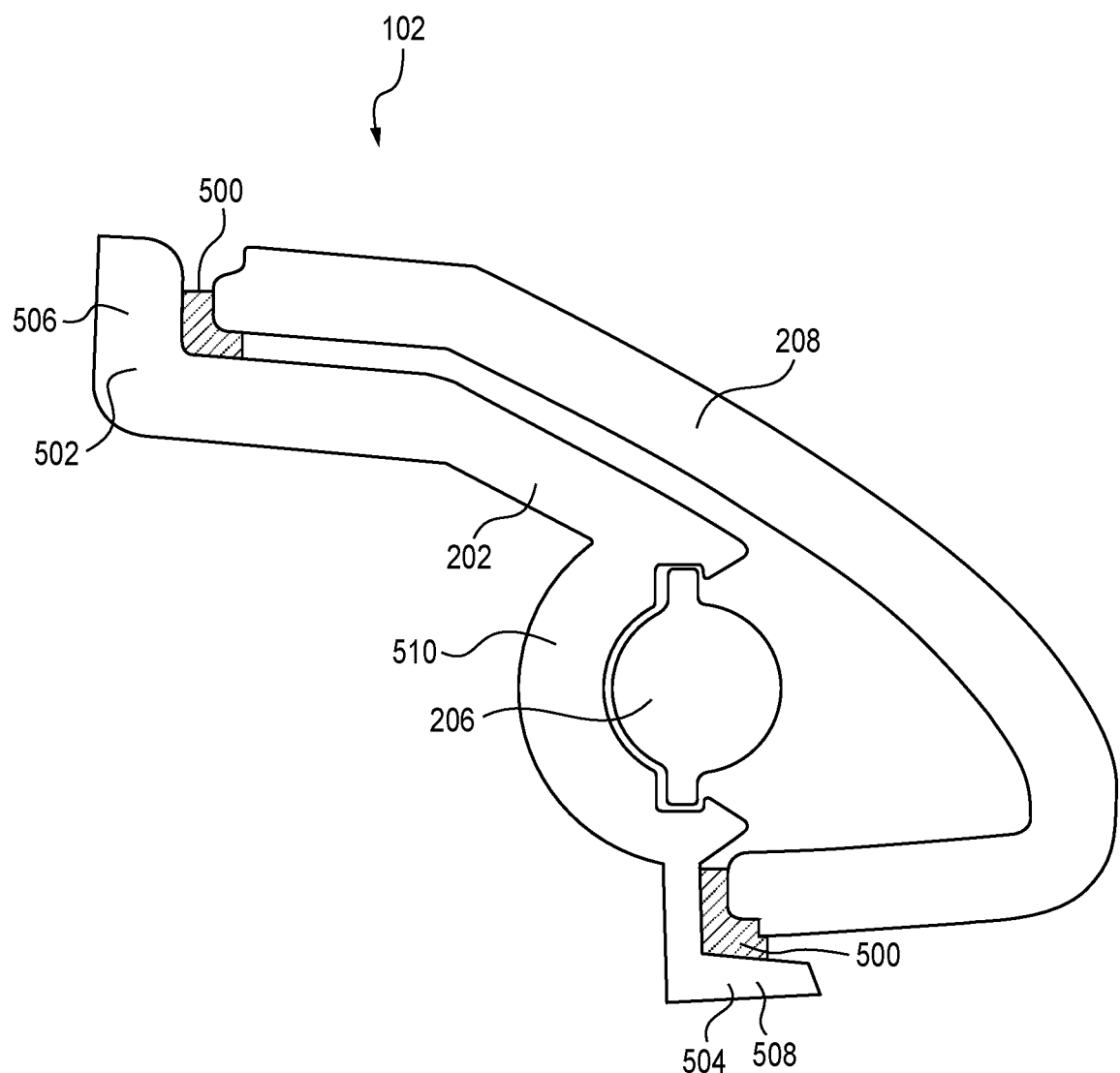
FIG. 5 is a cross-sectional view of the grille.

With respect to FIGS. 2 and 5, the grille 102 is assembled by installing the base 202 on the mesh layer 200, installing the light source 204 and light guide 206 on the base 202, and then installing the completed lens component 208 on the base 202, capturing the light guide 206 and light source 204 therein. Sealing material 500 of the type known to those skilled in the art may be provided around the outer edge 502 of the base 202 and around the inner edge 504 of the base 202 to seal the light source 204 and light guide 206 from dust, debris, or moisture that may affect the performance of the light source 204 or light guide 206. The outer edge 502 and inner edge 504 of the base 202 may include L-shaped lips 506, 508 to better receive the lens component 208 and to facilitate the sealing procedure described herein.

The light source 204, as previously stated, which may include LEDs within the grille 102, may provide vehicle identification via illumination or for decorative illumination. When the light source 204 is turned off, or otherwise de-energized to cease illumination, the film 300 provides a predetermined surface appearance, such as chrome appearance usually associated with grilles 102 for motor vehicles 100. When the light source 204 is actuated under predetermined conditions, light is allowed to pass through the opening 404 in the light blocker 304 to the lens 302 to illuminate the lens component 208. The light source 204 may be attached, via a wiring harness, to the lighting circuit of the motor vehicle 100 used to turn on and off the parking lights 104, fog lights 106, and/or the headlights 108 of the motor vehicle 100, all shown in FIG. 1.

The light source 204 and light guide 206 are configured to be positioned behind the lens component 208 and are suitably sized to be placed between the base 202 and lens component 208. The light guide 206, which extends around the entire perimeter of the grille 102 on the base 202, may be attached to the base 202 by a bracket, or, as illustrated in FIG. 5, may be held by clip 510 integrally formed within the base 202 using friction, fasteners, adhesive, and combinations thereof, or any other fasteners suitable for positionally securing the light guide 206 to the base 202.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A grille for a motor vehicle, comprising:
a base extending around a perimeter of the grille;
a light guide received in the base extending around the perimeter of the grille;
a light source for illuminating the light guide when activated;
a lens covering the base and the light guide;
a light blocker masking an interior of the lens except at a portion where light from the light guide is to pass when the light guide is illuminated; and
a film covering an exterior of the lens and having a predetermined surface appearance when the light guide is not illuminated and allows light to pass through the film upon illumination of the light guide.

2. The grille of claim 1 wherein the lens is attached to an outer edge of the base and an inner edge of the base.

3. The grille of claim 1 wherein the film is formed of a material with a chrome appearance and is translucent for light transmission upon illumination of the light guide.

4. The grille of claim 3 wherein the lens is formed of a transparent plastic material.

5. The grille of claim 4 wherein the transparent plastic material is selected from the group consisting of acrylonitrile butadiene styrene, a transparent polycarbonate, and poly(methyl methacrylate).

6. The grille of claim 1 wherein the film is pre-formed and overmolded and the lens is injection molded to a back side of the film.

7. The grille of claim 6 wherein the light blocker is a preformed opaque plastic material.

8. The grille of claim 7 wherein the opaque plastic material is black acrylonitrile butadiene styrene.

9. The grille of claim 7 wherein the light blocker is laser cut to provide the portion where light from the light guide is to pass when the light guide is illuminated.

10. The grille of claim 1 further comprising:
a mesh, the base extending around an outer edge of the mesh.

11. The grille of claim 1 wherein the light source is a light emitting diode.

12. A grille for a motor vehicle, comprising:
a base extending around a perimeter of the grille;
a light guide received in the base extending around the perimeter of the grille;
a light source for illuminating the light guide when activated; and
a lens component having a predetermined surface appearance when the light guide is not illuminated and allowing light to pass through the lens component upon illumination of the light guide, wherein the lens component comprises:
a lens covering the base and the light guide;
a light blocker masking an interior of the lens except at a portion where light from the light guide is to pass when the light guide is illuminated; and
a film covering an exterior of the lens, the film having the predetermined surface appearance when the light guide is not illuminated and allowing light to pass through the film upon illumination of the light guide.

13. The grille of claim 12 further comprising:
a mesh, the base extending around an outer edge of the mesh.

14. The grille of claim 12 wherein the light source is a light emitting diode.

15. The grille of claim 12 wherein the lens component is sealed to an outer edge of the base and an inner edge of the base.

16. The grille of claim 12 wherein the film is formed of a material with a chrome appearance and is translucent for light transmission upon illumination of the light guide.

17. The grille of claim 16 wherein the lens is formed of a transparent plastic material.

18. The grille of claim 17 wherein the light blocker is a preformed opaque plastic material laser cut to provide the portion where light from the light guide is to pass when the light guide is illuminated.

19. A grille for a motor vehicle, comprising:
a base extending around a perimeter of the grille;
a light guide received in the base extending around the perimeter of the grille;
a light source for illuminating the light guide when activated;
a lens formed of a transparent plastic material covering the base and the light guide, the lens being attached to an outer edge of the base and an inner edge of the base;
a light blocker made of an opaque plastic material masking an interior of the lens except at a portion where light from the light guide is to pass when the light guide is activated; and
a film covering an exterior of the lens and having a predetermined surface appearance when the light guide is not activated and allows light to pass through the film when the light guide is activated.

* * * * *